Patented Apr. 5, 1932

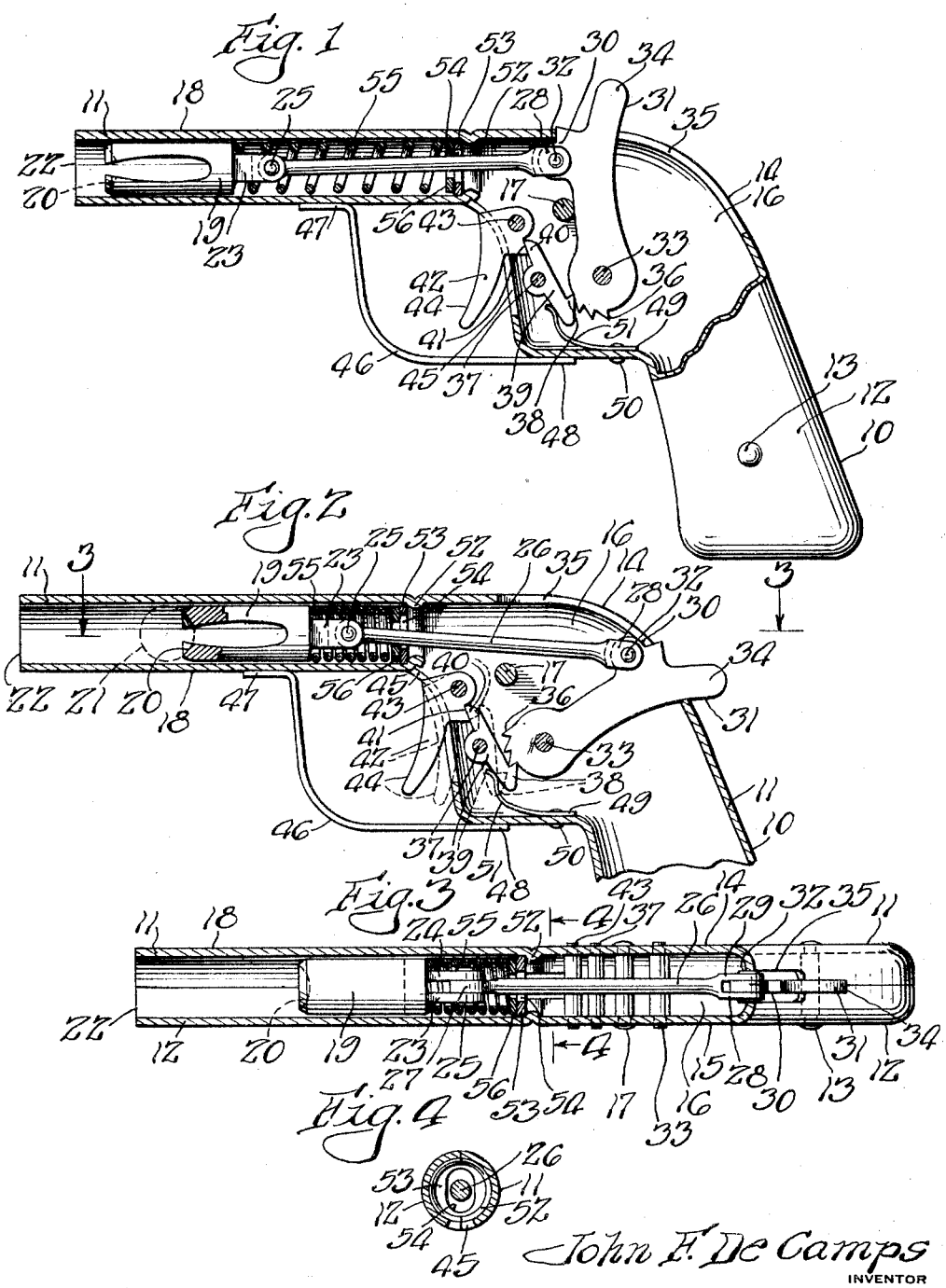

1,852,401

UNITED STATES PATENT OFFICE

JOHN F. DE CAMPS, OF DANVILLE, ILLINOIS

MARBLE SHOOTING PISTOL

Application filed June 25, 1930. Serial No. 463,750.

This invention relates to certain novel improvements in marble shooting pistols and has for its principal object the provision of an improved construction of this character which will be highly entertaining in use and economical in manufacture.

The salient object of my invention is the provision of a toy pistol for shooting marbles and the like which will be highly entertaining for children.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a sectional view of the pistol taken through the barrel and breech and showing the operating parts in one position;

Fig. 2 is a view similar to Fig. 1 but showing the operating parts in another position;

Fig. 3 is a sectional view taken substantially on the line 3—3 in Fig. 2; and

Fig. 4 is a sectional view taken substantially on the line 4—4 in Fig. 3.

Referring to the drawings wherein a preferred form of construction of the invention is illustrated, 10 indicates the stock of the pistol which includes matched sections 11 and 12 which are attached by means of a suitable connecting element such as rivet 13 to portions 14 and 15 providing the breech 16 and these portions 14 and 15 are joined by means of suitable connecting elements such as rivet 17 or the like. Formed integrally with the portions 14 and 15 which provide the breech 16 is the barrel 18 which is formed of suitable non-magnetic material.

A plunger 19 of suitable magnetic material is disposed in the barrel 18 and the forward end portion of the barrel has a recess 20 formed therein which is substantially a spherical segment in shape. The plunger 19 is made of suitable magnetic material and the forward end portion in which the recess 20 is provided is magnetized and in the use of the invention a marble 21 of any suitable magnetic material such as iron or the like is inserted through the mouth 22 of the barrel and attracted into and retained in the recess 20 by the attraction of the magnetized plunger 19.

Attached to the plunger 19 at the rear end thereof and in any suitable manner such as by welding or the like are arms 23 and 24. Inserted through openings provided in the rear end of the arms 23 and 24 is a pin 25 which is retained in the arms 23 and 24 in any approved manner such as by riveting. Mounted on the pin 25 is a hammer arm 26 which includes a portion 27 having an opening extended therethrough and through which the pin 25 projects. The arm 26 includes a bifurcated rear end portion which provides arms 28 and 29 and extending between these arms is a tongue portion 30 of the hammer 31. The arms 28 and 29 and the tongue portion 30 of the hammer have openings formed therein through which a pin 32 projects thus connecting the arm 26 to the hammer 31. The hammer 31 is mounted on a stud 33 which is seated in the walls 14 and 15 of the breech and included in the hammer is a head portion 34 which projects outwardly from the breech in a slot 35 provided therein.

Formed in the periphery of the hammer 31 on the lower side thereof are teeth 36 and mounted movably on a stud 37 and including a tooth 38 which is adapted for engaging the teeth 36 is a dog 39. Included in the dog 39 is a portion 40 which has abutting engagement with a shoulder 41 provided in the trigger 42 which is movably mounted on a stud 43. The trigger 42 includes a finger portion 44 which projects downwardly through a slot 45 provided in the breech and a guard 46 is provided for the trigger, this guard including a portion 47 which is attached to the barrel 18 in any approved manner such as by welding and including a portion 48 which may be similarly attached to the wall 14 of the breech. A flat spring 49 is mounted in the wall 15 inwardly thereof by means of a suitable connecting element such as rivet 50 and this spring includes an upwardly extending arcuated portion 51 which has abutting engagement with the tooth 38 of the dog 39.

An annular shoulder 52 is formed in the barrel 18 inwardly thereof and adjacent the rear end thereof and disposed forwardly of the shoulder 52 is a cylindrical stop 53 which has an opening 54 provided therein through which the arm 26 projects. A coil spring 55 is provided in the barrel 18 between the rear end of the plunger 19 and the forward end of the stop 53 and provided on the arm 26 between the spring and the stop 53 is a washer 56.

It will be manifest, therefore, that when a marble 21 of any suitable magnetic material such as steel is inserted through the mouth 22 into the barrel 18 and the hammer head 34 retracted into cocked position the operating parts will be disposed as in Fig. 2. In this position, the tooth 38 of the dog 39 is in engagement with the teeth 36 on the hammer 31 and the dog 39 is retained in this position while the hammer is in cocked position. When the parts are disposed as in Fig. 2 and the marble inserted into the barrel the marble is attracted by the magnetized forward end portion of the plunger and the marble is therefore retained in position as shown in Fig. 2 in which it will be seen that a portion of the marble is disposed in the recess 20 of the plunger 19. When the person using the pistol pulls inwardly on the finger portion 44 of the trigger 42 the shoulder 41 of the trigger abuts the upper portion 40 of the dog 39 and the dog is moved in a clockwise direction causing the release of the tooth 38 of the dog from the teeth 36 in the hammer thereby releasing the hammer and causing the release of the spring 55. The release of the spring 55 by the action of squeezing the trigger as described above causes the spring to extend itself into position as shown in Fig. 1 and thus causing the plunger 19 to be propelled rapidly forward in the barrel and in this manner ejecting the marble out of the mouth of the barrel after which the operation described above may again be repeated.

While in the foregoing description of my invention I have described the plunger as being magnetized and therefore operable with marbles made of magnetically active material it is understood that I may vary the construction of the plunger so that a marble may be held in the barrel by means of a plunger embodying other retaining means than magnetic attraction such as a grip or spring associated with the plunger.

From the foregoing description of the invention it will be manifest that I have provided a marble shooting pistol which while being simple in construction and economical in manufacture will be highly entertaining in use.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. In a device of the class described, a housing including a portion providing a barrel, a plunger movable in said barrel and formed of magnetic material, said plunger including a magnetized outer end portion having a recess provided therein, operating means for said plunger, and means providing connection between said operating means and said plunger.

2. In a device of the class described, a housing including a portion providing a barrel of non-magnetic material, a plunger movable in said barrel formed of magnetic material, said plunger including a magnetized outer end portion having a recess formed therein, said recess being substantially a spherical segment in shape, operating means for said plunger, and means providing connection between said plunger and said operating means.

3. In a device of the class described, a housing including a portion providing a barrel formed of non-magnetic material, a plunger movable longitudinally through said barrel, said plunger being formed of magnetic material and being magnetized, said plunger having an inwardly extending recess formed in the forward end portion thereof, operating means for said plunger including a spring member disposed in said barrel rearwardly of said plunger, means for retaining said spring member in said barrel, means providing connection between said plunger and said operating means, and means for mounting said operating means in said housing.

4. In a device of the class described, a housing including a portion providing a barrel formed of non-magnetic material, a plunger movable in said barrel, said plunger being formed of magnetic material and being magnetized, said plunger having an inwardly extending recess formed in the forward end portion thereof, operating means for said plunger including a spring member disposed in said barrel and having abutting engagement with said plunger and including an elongated member attached to said plunger and projecting through said barrel into said housing, means for retaining said spring member in said housing, means for attaching said elongated member at one end thereof to said plunger, operating means for said elongated member, and means for attaching said elongated member to said operating means.

5. In a device of the class described, a housing including a portion providing a barrel formed of non-magnetic material, a plunger movable in said barrel, said plunger being formed of magnetic material and being magnetized, said plunger having an inwardly extending recess formed in the forward end portion thereof, operating means for said plunger including a spring member disposed in said barrel and having abutting engagement with said plunger and including an elongated member attached to said plunger and projecting through said barrel into said housing, means for retaining said spring member in said housing, means for attaching said elongated member at one end thereof to said plunger, operating means for said elongated member including a hammer member, means for attaching said elongated member to said hammer member, actuating means for said hammer including a trigger member, and means providing movable connection between said trigger member and said hammer member whereby when said hammer member is in retracted position and a projectile member disposed in said recess said trigger member may be actuated for projecting said last-mentioned member out of said barrel.

6. A toy gun comprising a barrel, a slidable member in said barrel, including an outer magnetized end portion provided with a missile-receiving recess, and operating means for said member including a trigger.

In testimony whereof I affix my signature.

JOHN F. DE CAMPS.